June 22, 1926.
S. FORSSÉN
1,589,746
RETORT
Filed Nov. 25, 1924
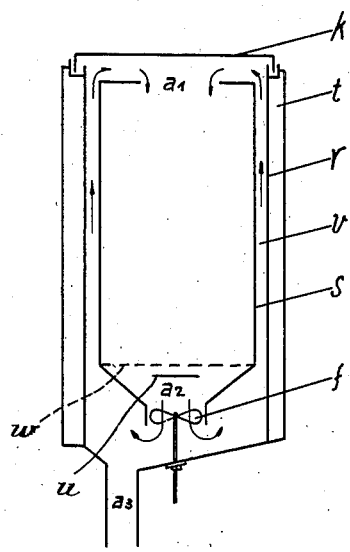
Inventor
Sigurd Forssén
by Ixxa, Kedlenbuk & Finley
Attorneys.

Patented June 22, 1926.

1,589,746

UNITED STATES PATENT OFFICE.

SIGURD FORSSÉN, OF JYVASKYLA, KUIKKA, FINLAND.

RETORT.

Application filed November 25, 1924, Serial No. 752,165, and in Suomi-Finland December 21, 1923.

This invention relates to retorts and particularly to retorts adapted for making charcoal from wood, although the principles of construction for a retort, in accordance with this invention, may be employed for drying purposes generally or for distillation processes. The principal object of the invention is to provide a new and improved construction for a retort of simple and inexpensive construction, and of great efficiency.

The accompanying drawing is a somewhat diagrammatic cross sectional view of a retort constructed in accordance with the principles of my invention.

As shown in the drawing, the retort consists of an outer casing $r$ intended to be heated in any suitable way from the outside thereof. The casing preferably being provided with an annular air space $t$. Concentrically located within the outer casing $r$ and spaced therefrom so as to provide an annular space $v$, is a vessel $s$, adapted to contain the material to be treated. The lower end of the vessel $s$ is provided with an inwardly tapered neck, having a central aperture $a^2$ at the end thereof, above which a baffle plate $u$ is mounted, while the upper end or top of the vessel $s$ is provided with an aperture $a^1$ in axial alignment with the aperture $a^2$. A foraminated screen $w$ is placed in the bottom of the vessel and serves to support the material being treated. A cover $k$ is adapted to be placed upon the outer casing $r$ and is spaced from the top of the vessel $s$ to provide a passageway which communicates with the top of the annular space $v$. The vessel $s$ is supported in any suitable manner within the outer casing $r$, so as to provide a space at the bottom of said casing between the vessel and the casing, with which space the annular space $v$ is in communication. An outlet pipe $a^3$ is connected to the bottom of the casing $r$ for permitting the escape of combustion gases, vapors or the like. It will be noted that the space between the bottom of the vessel $s$ and the outer casing, the space between the vessel and the cover $k$, and the annular space $v$, constitute a continuous passage. Means are provided for circulating through the material, within the vessel $s$, the air heated within this passage, by the heat applied to the outside of the retort, and such means comprises a fan blower $f$, located in the opening in the bottle neck of the vessel $s$, said fan being mounted upon a shaft which projects through the bottom of the retort, and which may be driven by any suitable means.

The operation of the device is as follows: The material to be treated, as for example, wood, which it is desired to convert into charcoal is placed upon the screen $w$ at the bottom of the vessel $s$. The retort is then heated from the outside by any suitable means. The rotation of the fan $f$ causes the heated air within the passage between the vessel $s$ and the outer casing $r$ to be drawn inwardly through the opening $a'$, down through the material within the vessel $s$, and expelled through the aperture $a^2$ at the bottom of the vessel, the course of the heated air being indicated by the arrows in the drawing. The provision of the baffle $u$ prevents the air from being drawn through the vessel $s$ only in the central region thereof, and insures that the air will be distributed throughout the material at the sides of the vessel, as well as in the center thereof. Whenever the pressure within the retort increases, because of the presence of gases or vapors, due to the combustion of the material within the vessel, such gases will pass outwardly through the opening $a^3$.

I claim:

1. A retort comprising an outer casing, an inner vessel in which the material to be treated is adapted to be placed, said vessel being mounted concentrically within, and having its side walls spaced from, the inner walls of said retort to provide an annular passage, said vessel having a frustro-conical bottom with an aperture at the center thereof, and having its top provided with an aperture in axial alignment with the bottom aperture, a cover mounted on said retort and spaced from the top of said vessel, and the bottom of said receptacle being spaced from the bottom of said retort, the spaces at the bottom and top of said vessel being in free communication with said annular passage, and a draft inducing device located in the aperture at the bottom of said receptacle to cause the air heated in said annular passage to be circulated through the interior of said vessel.

2. A device as set forth in claim 1, in which a baffle plate is mounted above the draft inducing device in axial alignment with the bottom aperture to cause the air to be circulated throughout the entire mass of material within said vessel.

In testimony whereof I have affixed my signature.

SIGURD FORSSÉN.